(No Model.) 2 Sheets—Sheet 1.

F. O. WILLIAMS & J. C. MATTICE.
POTATO DIGGER.

No. 338,812. Patented Mar. 30, 1886.

WITNESSES
F. L. Durand
Edward Stanton

Francis O. Williams
John C. Mattice
INVENTORS.

By Louis Bagger & Co.
Attorneys.

(No Model.) 2 Sheets—Sheet 2.

F. O. WILLIAMS & J. C. MATTICE.
POTATO DIGGER.

No. 338,812. Patented Mar. 30, 1886.

WITNESSES
F. L. Durand
Edward Stanton

Francis O. Williams
John C. Mattice
INVENTORS.

By Louis Bagger & Co.
Attorneys.

UNITED STATES PATENT OFFICE.

FRANCIS O. WILLIAMS AND JOHN C. MATTICE, OF COHOCTON, NEW YORK.

POTATO-DIGGER.

SPECIFICATION forming part of Letters Patent No. 338,812, dated March 30, 1886.

Application filed November 6, 1885. Serial No. 182,034. (No model.)

*To all whom it may concern:*

Be it known that we, FRANCIS O. WILLIAMS and JOHN C. MATTICE, both citizens of the United States, and residents of Cohocton, in the county of Steuben and State of New York, have invented certain new and useful Improvements in Potato-Diggers; and we do hereby declare that the following is a full, clear, and exact description of the invention, which will enable others skilled in the art to which it appertains to make and use the same, reference being had to the accompanying drawings, which form a part of this specification, and in which—

Figure 1:
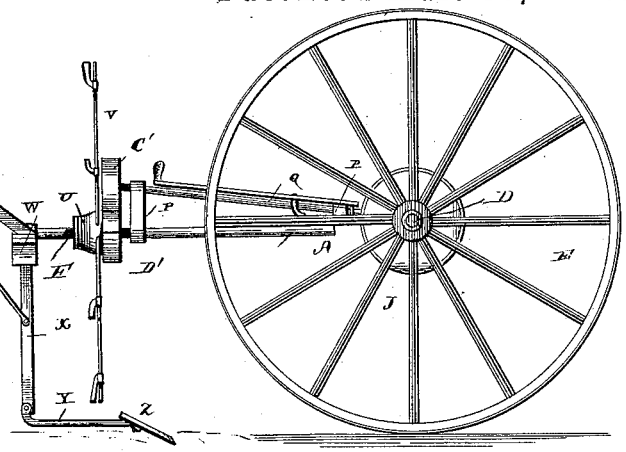
Figure 3:
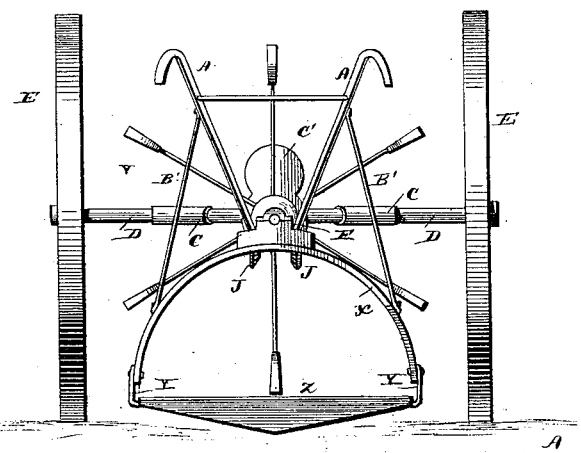
Figure 5:
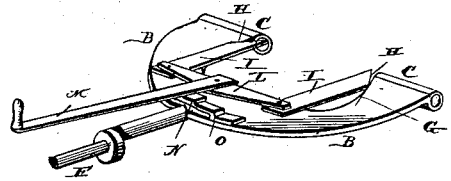
Figure 5:
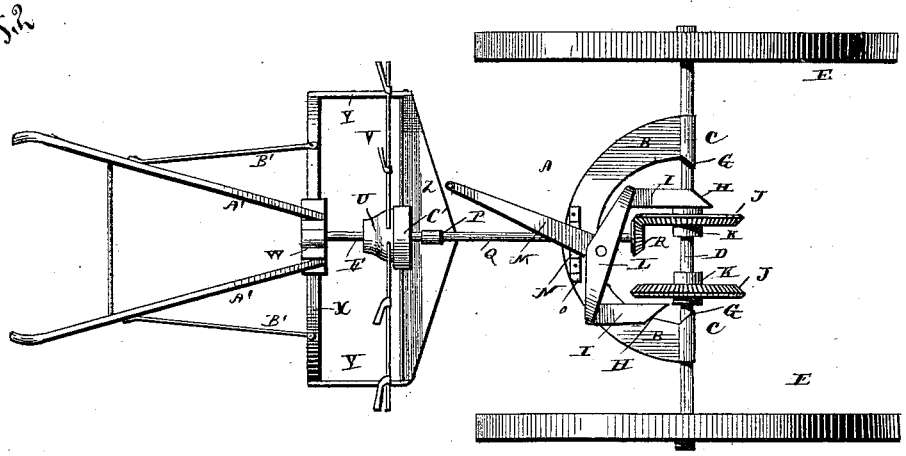
Figure 4:
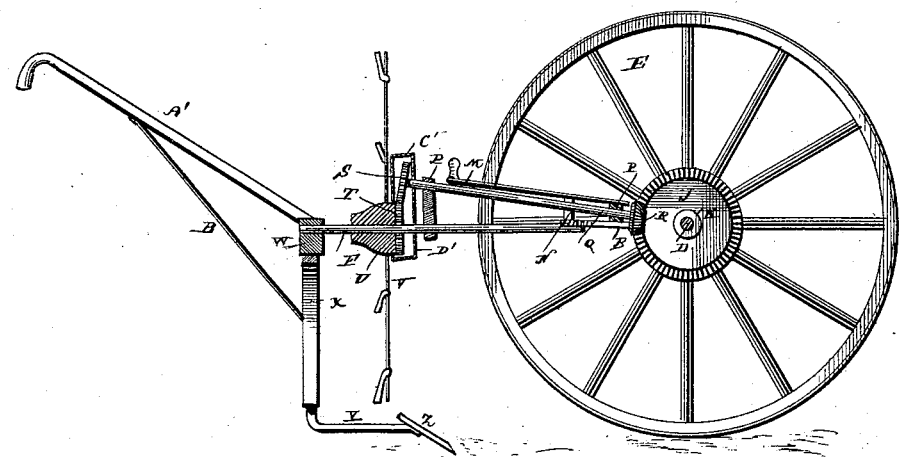
Figure 6:
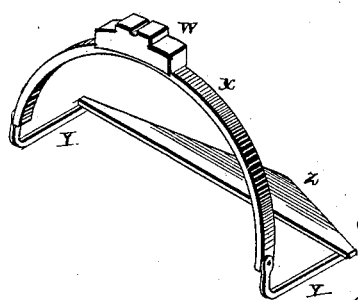

Figure 1 is a side view of our improved potato-digger. Fig. 2 is a top view of the same. Fig. 3 is a rear view. Fig. 4 is a longitudinal vertical section on line $x\,x$, Fig. 2. Fig. 5 is a perspective detail view of the frame of the machine, showing the shifting-lever and its stop; and Fig. 6 is a similar view of the shoe and its support.

Similar letters of reference indicate corresponding parts in all the figures.

Our invention has relation to that class of potato-diggers having a shoe which opens the ground and brings the potatoes to the surface, and a stirring-reel which throws the dirt and vines to the side, leaving the potatoes exposed in the row, and it contemplates certain improvements upon the potato-digger for which Letters Patent No. 324,202 were granted to us on the 11th day of August, 1885; and it consists to that end in the improved construction and combination of parts of the same, as hereinafter more fully described and claimed.

In the accompanying drawings, the letter A indicates the main frame, which consists of two arms, B B, having transverse bearings C in their ends for the reception of the drive-axle D, which is provided with the drive-wheels E at its ends, while the rear end of the frame is formed into a spindle, F.

The draft may be connected to the bifurcated forward end of the frame in any suitable manner.

The inner ends of the bearings, formed in the forward ends of the frame-arms, are beveled, as shown at G, and the forward beveled ends, H, of two bars, I I, sliding longitudinally upon the upper side of the frame, bear against the said beveled ends, while the inner sides of the said arms bear against the outer sides of two beveled cog-wheels, J J, which are secured upon a sleeve, K, sliding upon and turning with the drive-axle, so that by forcing either of the beveled bars forward the sleeve and its cog-wheels will be pushed from that side. The inner ends of these bars are pivoted to a T-head or cross-head, L, at the forward end of a lever, M, which is pivoted upon the forward end of the frame, and which may be held in its position, thrown either to one side or the other, by means of an upwardly-projecting bulge, N, upon a bail or stirrup, O, secured at its ends to the arm of the frame. The frame has longitudinal bearings P secured upon its upper side, said bearings inclining slightly forward, and a longitudinal shaft, Q, is journaled in these bearings and is provided with a bevel-pinion, R, at its forward end, which may mesh with either of the pinions upon the drive-axle. The rear end of the longitudinal shaft is provided with a pinion, S, which meshes with a pinion, T, upon the forward end of the stirrer-hub U, which turns upon the spindle F, at the rear end of the frame. The stirrer-reel V is of the same construction as the reel shown and described in our former patent, and needs no further description. A box, W, is clamped to the rear end of the spindle, and an arched standard or frame, X, projects from the box, having the supporting-arms Y for the opening-shoe Z secured to its lower ends. The supporting-arms have their lower ends bent forward, and the shoe, which has preferably an obtusely-pointed forward edge, is secured at its ends to the forward ends of the supporting-arms.

Suitable handles, A' A', are secured to the box at the rear end of the frame for guiding the machine, the said arms having braces B' projecting to the ends of the curved standards. It will be seen that the stirrer-reel being in front of the arms supporting the shoe, it will clear all vines and dirt, which have been stirred up by the shoe breaking up the ground, to one side, preventing such articles from obstructing the progress of the machine, and the said rubbish may be thrown to either side, as it may be desired, by reversing the motion of the longitudinal shaft, which may be accomplished by throwing either of the beveled cog-wheels into engagement with the pinion at the forward end of the longitudinal shaft. The pinion on the rear end of the said shaft and the pinion upon the hub of the reel are preferably covered by means of caps C' and D', which prevent dust and dirt from entering between the cogs and obstruct their free action. The beveled ends of the longitudinally-sliding arms will slide the sleeve and its cog-wheels upon the shaft or drive-axle, and will act quickly and surely, so that the revolution of the reel may be changed in a moment of time, the wedge-shaped forward ends of the arms exerting great force upon the ends of the sleeve, and at the same time acting quickly, so that the cog-wheel brought toward the pinion at the end of the longitudinal shaft will quickly catch into the cogs of the said pinion without any possibility of slipping.

The frame is simple of construction, and consists of few parts, and the entire machine is composed of few parts, so that it may be manufactured at a comparatively small expense, and be easily put together and kept in repair, as well as manipulated. By sliding the sleeve carrying the cog-wheels upon the drive-axle so that the hand-lever rests upon the bulged portion of the guide-bail the cog-wheels will both be out of engagement with the pinion upon the forward end of the longitudinal shaft, and the machine may be transported from one place to another without revolving the reel, the shoe being lifted above the surface of the ground.

Having thus described our invention, we claim and desire to secure by Letters Patent of the United States—

1. In a potato-digger, the combination of a wheeled frame formed into a spindle at its rear end, a stirring-reel journaled upon the said spindle and having a pinion upon its hub, a shaft journaled in longitudinal bearings upon the frame, and having a pinion upon its rear end meshing with the pinion upon the hub of the reel, and a pinion at its forward end, and a drive-axle having cog-wheels meshing with the pinion at the forward end of the longitudinal shaft, as and for the purpose shown and set forth.

2. In a potato-digger, the combination of a frame having forwardly-projecting arms formed into bearings at their ends, having beveled inner ends, a drive-shaft journaled in the said bearings, a sleeve sliding upon and turning with the said axle and provided with pinions upon its ends, a pinion meshing with either of the cog-wheels, a lever having a cross-head at its pivoted end, and bars pivoted to the ends of the cross-head, and having beveled forward ends bearing against the beveled inner ends of the bearings, and having their inner edges bearing against the outer faces of the cog-wheels, as and for the purpose shown and set forth.

3. In a potato-digger, the combination of a bifurcated frame having bearings in the forward ends of its forward bifurcated arms, and having its rear end formed into a spindle, a drive shaft or axle having the drive-wheels at its ends journaled in the bearings in the ends of the frame-arms, cog-wheels connected by a sleeve and sliding upon and turning with the axle, means for sliding the said sleeve and cog-wheels, a stirring-reel journaled upon the spindle at the rear end of the frame and having a pinion upon its hub, a shaft journaled longitudinally upon the frame and having a pinion at its rear end meshing with the pinion of the hub, and having a pinion at its forward end meshing with either of the sliding cog-wheels, and a box secured to the rear end of the spindle and having a curved standard or frame secured to it, provided at its lower ends with forwardly-bent arms having an opening-shoe secured between their ends, as and for the purpose shown and set forth.

4. In a potato-digger, the combination of a frame having its forward end bifurcated and provided with transverse bearings in the ends of the bifurcated arms, and having its rear end formed into a spindle, a drive-axle journaled in the bearings, and a box secured to the rear end of the spindle, and provided with a curved frame having forwardly-bent arms secured to its lower ends, provided with an opening-shoe secured between the ends of the said arms, as and for the purpose shown and set forth.

5. In a potato-digger, the combination of an axle, a sleeve sliding upon and turning with the said axle and having cog-wheels at its ends, a pinion meshing with either of the cog-wheels, bearings for the axle having their inner ends beveled, and bars having their ends beveled at their outer edges, bearing against the beveled ends of the bearings, and having means for forcing one forward and the other back, the inner edges of the bars bearing against the cog-wheels, as and for the purpose shown and set forth.

In testimony that we claim the foregoing as our own we have hereunto affixed our signatures in presence of two witnesses.

FRANCIS O. WILLIAMS.
JOHN C. MATTICE.

Witnesses:
THOMAS WARNER,
ASA McDOWELL.